United States Patent
Mies et al.

(10) Patent No.: US 7,117,609 B2
(45) Date of Patent: Oct. 10, 2006

(54) DEVICE, CNC MEASURING DEVICE, AND METHOD FOR MEASURING A ROTATIONALLY SYMMETRIC PRECISION PART

(75) Inventors: Georg Mies, Wipperfürht (DE); Harald Wüster, Radevormwald (DE)

(73) Assignee: Klingelnberg GmbH, Huckeswagen (DE)

( * ) Notice: Subject to any disclaimer, the term of this patent is extended or adjusted under 35 U.S.C. 154(b) by 17 days.

(21) Appl. No.: 11/081,189

(22) Filed: Mar. 16, 2005

(65) Prior Publication Data
US 2005/0204571 A1      Sep. 22, 2005

(30) Foreign Application Priority Data
Mar. 16, 2004   (EP) ................... 04006217

(51) Int. Cl.
*G01B 3/50*      (2006.01)
(52) U.S. Cl. .................. 33/501.9; 33/503; 33/1 PT
(58) Field of Classification Search .............. 33/501.9, 33/503, 549, 553, 554, 555, 1 PT, 1 N; 702/151, 702/155
See application file for complete search history.

(56) References Cited

U.S. PATENT DOCUMENTS

| | | | | |
|---|---|---|---|---|
| 937,667 | A | * | 10/1909 | Reynolds .................. 33/501.9 |
| 2,509,185 | A | * | 5/1950 | Eckel ....................... 33/501.9 |
| 3,078,583 | A | * | 2/1963 | Chase et al. ................ 33/503 |
| 3,649,820 | A | * | 3/1972 | Totsuka et al. ............. 702/162 |
| 3,852,579 | A | * | 12/1974 | Sohn et al. ................ 702/167 |
| 3,938,254 | A | * | 2/1976 | Miller, Jr. ................... 33/549 |
| 3,942,254 | A | * | 3/1976 | Thompson et al. ........ 33/501.9 |
| 4,182,045 | A | * | 1/1980 | Bosch et al. ............... 33/501.9 |
| 4,275,507 | A | * | 6/1981 | von Haas .................. 33/501.9 |
| 4,498,335 | A | * | 2/1985 | Thoma ...................... 33/501.9 |
| 4,519,141 | A | * | 5/1985 | Meder et al. .............. 33/501.9 |
| 4,532,715 | A | | 8/1985 | Sterki |
| 4,697,168 | A | * | 9/1987 | Baker ........................ 702/151 |
| 5,224,272 | A | * | 7/1993 | Toraason et al. ............ 33/1 PT |

FOREIGN PATENT DOCUMENTS

DE       44 13 229 A      12/1994

OTHER PUBLICATIONS

Mikoleizig, G, "Rechnergesteuerte Messungen An Verzahnungen Und Verzahnwerkzeugen", Apr. 1, 1990, p. 207-211, Issn. 0340-4544, Springer Vertag, Berlin, DE Bd. 80, Nr. 4.

* cited by examiner

*Primary Examiner*—Diego Gutierrez
*Assistant Examiner*—Travis Reis
(74) *Attorney, Agent, or Firm*—McCormick, Paulding & Huber LLP

(57) ABSTRACT

A device for measuring a rotationally symmetric precision part, having a dog, drivable via a drive, and a revolving centering means, the dog and the revolving centering means being positioned in such a way that a rotationally symmetric precision part to be measured may be non-positively clamped coaxially between dog and centering means. A first angle measuring system is assigned to the dog, which provides signals that permit the drive-side angular position of the dog to be stated, and a further angle measuring system is assigned to the revolving centering means, which provides signals that permit the output-side angular position of the centering means to be stated. Software means are provided which determine slip between the dog and the rotationally symmetric precision part through a comparative calculation on the basis of the drive-side angular position and the output-side angular position.

18 Claims, 3 Drawing Sheets

DEVICE, CNC MEASURING DEVICE, AND METHOD FOR MEASURING A ROTATIONALLY SYMMETRIC PRECISION PART

The present invention relates to devices, CNC measuring devices, and methods for measuring rotationally symmetric precision parts, preferably a CNC-controlled gear tooth measuring center for checking spur gear teeth, as well as pinion and shaving cutters, worms and worm gears, hobbing cutters, and bevel gears.

BACKGROUND OF THE INVENTION

There are numerous processing methods for manufacturing rotationally symmetric precision parts, such as gear wheels. Typically, the precision part is measured during or after the processing.

In order to be able to check the precision of the processing of a precision part after processing, the precision part may be removed from the processing machine and clamped in a special measuring system, for example, where it is scanned and measured using sensors. Numerically controlled measuring devices are preferably used for this purpose. Typically, a rotationally symmetric precision part is clamped between a lower centering point and upper centering point for measuring. The lower centering point is seated on a table which may be moved precisely into different angular positions by a drive. The precision part is pressed against the lower centering point because of its intrinsic weight and the contact pressure which originates from the upper centering point. A rotational motion of the lower centering point is thus transmitted one-to-one to the precision part. The upper centering point only revolves, it is not also driven.

The present patent application is particularly concerned with CNC-controlled gear tooth measuring centers which are suitable for checking spur gear teeth, as well as pinion and shaving cutters, worms and worm gears, hobbing cutters, bevel gears, and general dimensional, shape, and position deviations on rotationally symmetric workpieces, for curve and camshaft measurement, or even for rotor measurement.

Investigations have shown that in precision parts having a small mass and a small diameter, such a construction having a lower centering point and an upper centering point is sufficient in order to rotate the precision part in solidarity with the lower centering point. Such a construction is sufficient above all if one operates using small angular accelerations.

Special measuring systems are increasingly used in order to measure precision parts having a larger diameter and higher weight. In addition, it is a very important requirement in measurements of this type that they are performed very precisely but as rapidly as possible.

The typical measuring systems are not able to meet such requirements. Rapid measurement of a complete precision part makes it necessary for multiple angular positions to be approached within a very short time and for a measurement sensor to scan the precision part in each angular position. The measuring systems are designed so that measurements may be performed even during the rotational motion. During rotation of the precision part, high angular accelerations arise which have been shown to lead to slip between the lower centering point and the precision part. The angular position of the lower centering point, respectively the drive, and the precision part thus no longer correspond to one another.

In order to be able to handle the problem of slip, larger and heavier precision parts are clamped using a dog, which preferably allows a form fit. A "form fit" is understood to mean that the force transmission between the dog and the precision part occurs through their shape. The slip may thus be eliminated as much as possible. However, it is a disadvantage of this achievement of the object that the mounting is complex and time-consuming and form-fitting dogs of this type are costly and often also heavy. In addition, handling the form-fitting dogs is complex and there are precision parts on which such dogs may not be used, since they have no appropriate collar on the shaft, for example. It is a further disadvantage that in spite of the use of form-fitting dogs, situations may occur in which slip occurs. This may be the case, for example, if the dog was mounted incorrectly or too loosely.

It is an object of the present invention to provide a device and a corresponding method which allows even larger or heavier precision parts to be measured rapidly and reliably.

SUMMARY OF THE INVENTION

The present invention is particularly intended to achieve the object of improving a numerically controlled measuring device (CNC measuring device) in such a way that it is suitable for a rapid complete measurement of a precision part, such as a gear wheel, and the measuring device has a simple and reliable construction.

In another aspect of the invention the object is achieved by a CNC measuring device. In which a dog and a revolving centering means hold the gearwheel non-positively and coaxially between the dog and centering means. A first angle measuring system provides signals that permit the drive-side of angular position of the dog to be stated, and a second angle measuring means provides signals that permit the output-side angular position to be stated. The two outputs are compared in software means to determine slip. A CNC controller is provided which allows the gearwheel to be rotated into different angular positions and scanned using a measuring head.

In still a further aspect of the invention the object is achieved by a method for measuring a rotationally symmetric precision part using a CNC measuring device having a dog, drivable via a drive, and a revolving centering means.

The method comprises frictionally clamping the precision part between the dog and the revolving centering means in such a way that the precision part is coaxially mounted between dog and centering means. Rotation of the precision part is accomplished by driving the dog using the drive. A statement of the drive-side angular position is made possible using a first angle measuring system, which provides signals. Determining an output-side angular position of the centering means is accomplished using a second angle measuring system which provides signals that permit the output-side angular position to be stated. Comparing the drive-side angular position and the output-side angular position permits a determination of slip between the dog and the precision part.

The object is achieved by a device for measuring a rotationally symmetric precision part, having a dog, drivable via a drive, and a revolving centering means. The dog and the revolving centering means are positioned so that a rotationally symmetric precision part to be measured may be clamped non-positively and coaxially between the dog and centering means, and a first angle measuring system is assigned to the dog, which provides signals that permit the drive-side angular position of the dog to be stated. A further angle measuring system is assigned to the revolving centering means, and provides signals that permit the output-side angular position of the centering means to be stated. Software means are provided, which determine slip between the dog and the rotationally symmetric precision part through a comparative calculation of the drive-side angular position and the output-side angular position.

Further advantageous embodiments of the device are disclosed.

BRIEF DESCRIPTION OF THE DRAWINGS

Exemplary embodiments of the present invention will be described in greater detail in the following with reference to the drawings which show.

DESCRIPTION OF THE PREFERRED EMBODIMENTS

Terms are used in connection with the present description which are also used in relevant publications and patents. However, it is to be noted that the use of these terms is merely to serve for better understanding. The ideas according to the present invention and the protective scope of the patent claims are not to be restricted by the specific selection of the terms. The present invention may be transferred without anything further to other systems of terms and/or special subjects. The terms are to be applied correspondingly in other special subjects.

Figure 1:
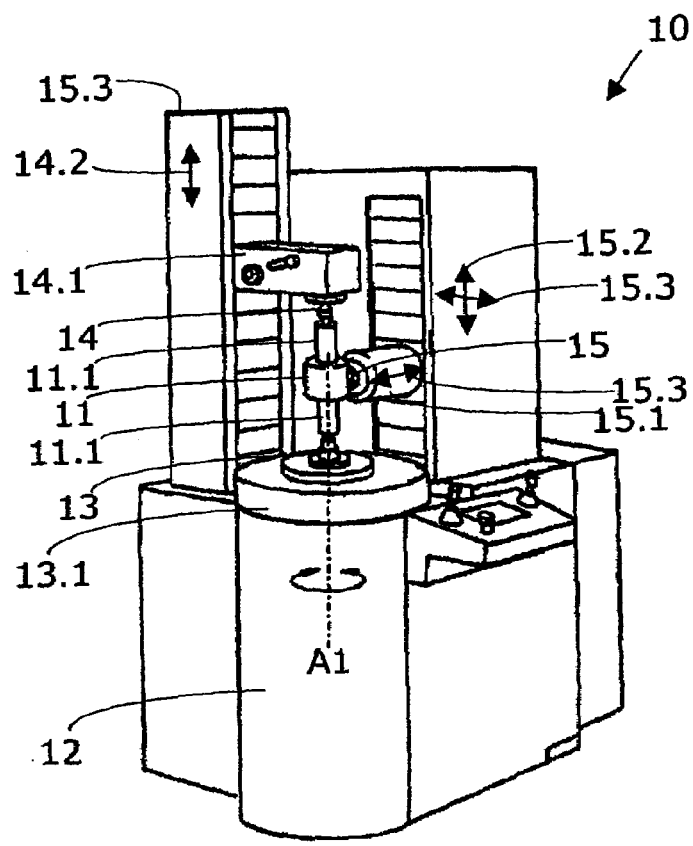
FIG. 1 a first measuring system according to the present invention.

An advantageous embodiment of the present invention, which is shown in FIG. 1, is a completely automatic, CNC-controlled gear tooth measuring center 10. The measuring center 10 is suitable for checking spur gear teeth, as well as pinion and shaving cutters, worms and worm gears, hobbing cutters, bevel gears, and general dimensional, shape, and position deviations on rotationally symmetric workpieces, for curve and camshaft measurement, or even for rotor measurement, to list only a few possible uses.

The measuring system 10 comprises a dog 13 drivable via a drive 12 and a revolving centering means 14, the dog 13 and the revolving centering means 14 being positioned so that a rotationally symmetric precision part 11 to be measured may be clamped coaxially between dog 13 and centering means 14, as is shown in FIG. 1 on the basis of a spur gear 11. The spur gear has a shaft 11.1, which extends upward and downward in the example shown. The drive 12 comprises a drive system and the controller of the drive system. Both are not visible in FIG. 1, since these elements are located behind a covering of the measuring system 10.

The dog 13 is preferably connected in a form-fitting way to a table 13.1, which is rotatable around a first axis of rotation A1 by the drive 12. In this case, the dog 13 has an axis of rotation which runs coaxially to the first axis of rotation A1. Preferably, an arm 14.1 is provided whose height may be displaced, as is indicated by the double arrow 14.2. The revolving centering means 14 is mounted within the arm 14.1 so that it may rotate easily around a vertical axis which is congruent with the axis of rotation A1 and it may be displaced upward against a restoring force when the precision part 11 is clamped. It is enormously important in both the mounting of the revolving centering means 14 and in the mounting of the dog 13 that the axes of rotation are precisely congruent.

As in a conventional measuring system, in the measuring system 10 according to the present invention as well, an angle measuring system (angle detector) is assigned to the dog 13, which provides signals that permit the drive-side angular position of the dog 13 to be stated. The angle measuring system is positioned below the table 13.1 and therefore is not visible in FIG. 1. According to the present invention, a separate angle measuring system is also assigned to the revolving centering means 14, which provides signals that permit the output-side angular position of the centering means 14 to be stated. Furthermore, according to the present invention, software means are provided, which determine a slip between the dog 13 and the rotationally symmetric precision part 11 through a comparative calculation on the basis of the drive-side angular position and the output-side angular position.

As shown in FIG. 1, the measuring system 10 comprises at least one sensor 15 for three-dimensional measurement (3-D probing system) of the precision part 11 clamped in the measuring system 10. An arm 15.1 is preferably provided, whose height may be displaced, as indicated by the double arrow 15.2. In addition, the sensor 15 may perform an adjustment motion, as indicated by the two double arrows 15.3 perpendicular to one another. The sensor 15 is extremely sensitive and it is important in rapid measurements that the sensor 15 does not collide with the precision part 11 during adjustment and/or during measurement parallel to the double arrows 15.3 or during rotation of the precision part 11 around the axis A1.

Investigations on different measurement constructions and systems have shown that it would only be possible with great complexity to make a quantitative statement about the slip in a conventional measuring system having the known and proven clamping device for precision parts. Even if the precision—i.e., the angular resolution of the angle measuring system which is assigned to the centering means 14 according to the present invention—is exactly as great as the precision of the angle measuring system on the drive side, one would nonetheless not be capable of precisely determining the current slip and continuing the measurement while taking the slip into consideration. The measurement precision of the measuring system, which is essentially determined by the precision of the sensor 15, the precision of the drive-side angle detector, and the precision of the three linear axes, would be strongly impaired in a system that determines the slip and continues the measurements while taking the slip into consideration using a computer. Above all, however, the reproducibility of the measurements would no longer be provided in certain circumstances.

A further problem is the attachment of the additional angle measuring system in the region of the revolving centering means 14. Difficulties arise in the mounting of the angle measuring system because of the height adjustability of the centering means 14. Such an angle measuring system must be able to detect each angular position to the second, but it must permit the centering means 14 to execute a displacement parallel to the axis of rotation A1 when the precision part 11 is clamped.

According to the present invention, another path is followed in order to allow rapid and still precise measurements, as is explained in detail in the following.

In a first advantageous embodiment, the angle measuring system is positioned on the revolving centering means 14 in such a way and the software means are designed in such a way that they rapidly recognize the occurrence of slip during the measurement. As soon as slip is recognized, a message is sent to the controller of the measurement sequence. This message allows the measurement sequence to be stopped in order to prevent faulty measurement or even to avoid the sensor 15 being damaged in the next measurement step if it is moved at adjustment speed against a tooth head, which is located at an angular position where a tooth gap was expected due to slip, during adjustment.

After the measurement sequence is stopped, the measurement of the precision part 11 may be started again, and/or the operator may intervene in order to eliminate the cause of the slip, and/or a special routine may be used which determines the actual angular position of the precision part 11 in order to then be able to continue the measurement procedure, and/or the measurement may be repeated automatically using lower angular acceleration.

Figure 2:
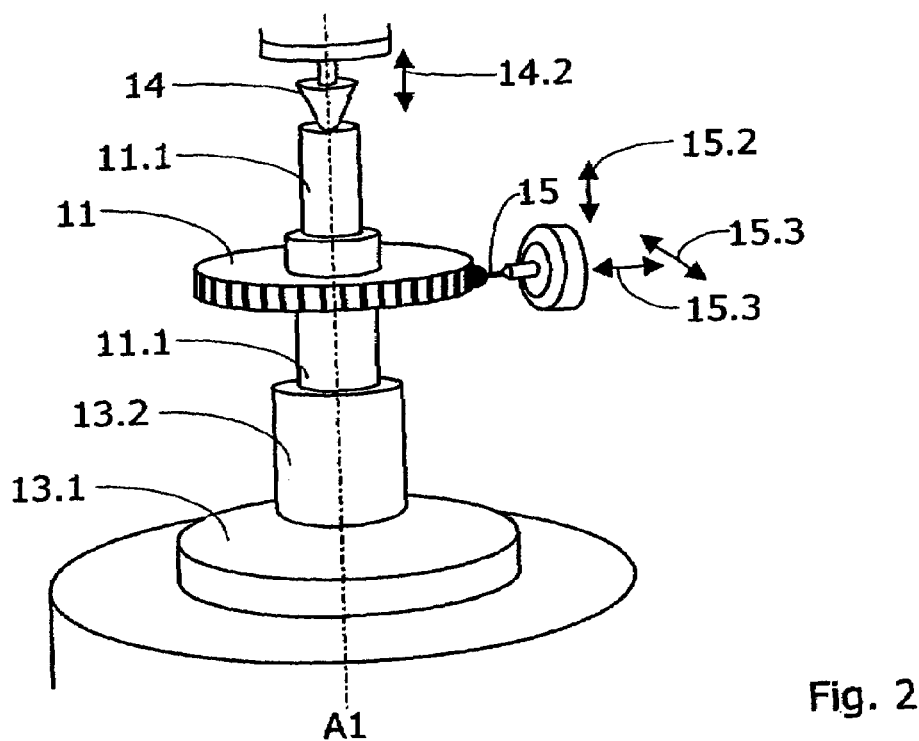
FIG. 2 a perspective detail view of a second measuring system according to the present invention.

A first method according to the present invention for measuring a rotationally symmetric precision part 11 runs as follows. Reference is made to FIG. 2. The precision part 11 to be measured is clamped between the dog 13.1, 13.2 and the revolving centering means 14 so that the rotation of the dog 13.1, 13.2 is transmitted in a form-fitting way to the precision part 11. For this purpose, the precision part 11 is mounted coaxially between the dog 13.1, 13.2 and the centering means 14. It is important that the centering means 14 is mounted so it is very smoothly rotatable and that it has a negligible moment of inertia, so that it is ensured the centering means 14 is carried along by friction at this point. In the example shown, a spur gear 11 having external teeth is measured. The spur gear 11 has a shaft 11.1, which extends upward and downward in the example shown. The precision part 11 is now rotated around an angular amount using a drive 12 by driving the dog 13.1, 13.2. A drive-side, very precise angle measuring system is used in this connection (also referred to herein as the first angle measuring system). The angle measuring system provides signals which permit the drive-side angular position to be stated. The drive may thus be activated in such a way that the desired angular position may be approached. The output-side angular position of the centering means 14 is now determined using a second angle measuring system, which provide signals that permit the output-side angular position, and/or a relative angular position in relation to the angular position measured by the first angle detector, to be stated. The drive-side angular position and the output-side angular position are then compared or set in relation to one another in order to determine the slip between the dog 13.1, 13.2 and the precision part 11.

In order that the method according to the present invention functions reliably, an alignment is preferably performed in an initialization step, which ensures that the first angle measuring system and the second angle measuring system are both set to zero, or which aligns the instantaneous angle measuring system positions. The two angle measuring systems may also be synchronized in order to allow a relative deviation during the comparison of the angular positions.

A further advantageous method is distinguished in that the steps cited are performed during the execution of measurement steps, a measuring head 15 employed during the execution of the measurement steps only being used if no slip was recognized. Only if the comparison of the angular positions displays correspondence as much as possible, or if the relative angular positions do not deviate from one another, is the measuring head 15 moved parallel to the double arrow 15.2 and/or to the double arrows 15.3.

A further advantageous method is distinguished in that the methods cited are performed in the course of a test run before the execution of measurement steps, the drive 12 driving the precision part 11 at different angular accelerations in order to determine a maximum permissible angular acceleration from which the slip occurs. Preferably, only angular accelerations which are lower than the maximum permissible angular acceleration are then set during the execution of the actual measurement steps.

A further advantageous embodiment of the present invention is distinguished in that a test run precedes the actual measurement method. The test run is designed so that the measuring system 10, using the additional angle measuring system, which is assigned to the revolving centering means 14, and using the software means, is capable of determining a permissible acceleration limiting value. The test run comprises the following method steps:

acceleration of the precision part 11 at a first angular acceleration by driving the dog 13 using the drive 12, stopping the precision part 11, determination of the angular position by the angle measuring system of the dog 13, determination of the angular position by the angle measuring system of the revolving centering means 14, determination of whether an angular difference has resulted between the angular positions (through comparison of the absolute angular positions or through a relative comparison), if no slip has resulted, selection of an angular acceleration which is greater than the first angular acceleration and repetition of the steps (1) through (5) using the higher angular acceleration, if a slip has resulted, determination of a permissible acceleration limiting value and transition to the actual measurement method, the measurement method being executed so that the permissible acceleration limiting value is not exceeded.

The device according to the present invention may preferably be equipped with an acceleration sensor which permits the instantaneous angular acceleration to be stated precisely. One may thus ensure better that no angular accelerations occur that lie above the maximum permissible angular acceleration.

There are different possibilities for designing this test run so that it converges as rapidly as possible, i.e., an acceleration limiting value may be determined as rapidly as possible.

It is an advantage of the embodiments according to the present invention that the precision—i.e., the angular resolution of the angle measuring system which is assigned to the centering means 14 according to the present invention—does not have to be as great as the precision of the angle measuring system on the drive side. The costs for the additional elements (angle measuring system, attachment means, and software means) are therefore not as high.

In a preferred embodiment, the measuring system is designed so that it may be loaded automatically. The precision part to be measured is preferably transferred by a robot arm from a processing station to the measuring system and clamped therein. The clamping occurs between the dog and the centering means. It would be relatively technically complex to implement the dog for larger precision parts so that it may clamp the precision part solidly, since for this purpose multiple jaws must typically be set and tightened solidly using screws or the like. According to the present invention, the typical dogs and centering tips may be used even for larger precision parts, since the slip is now detectable automatically. Therefore, typical measuring systems may be automated if they are equipped with the slip recognition according to the present invention.

Preferably, construction types which are mountable on the drive-side shaft are used as the drive-side angle measuring system. Such an angle measuring system provides signals which allow the drive-side angular position of the dog 13 to be stated. Typically, analog signals are provided, which are converted into digital signals (A/D conversion). The digital signals are then fed to the drive 12. As a result, the angular value having a resolution of n1 increments per rotation is available and angle changes are measured in steps, the smallest measurable change resulting for dn=1.

In a preferred embodiment, the drive-side angle measuring system, i.e., the angle measuring system which is assigned to the table 13.1, is designed so that it provides between 10,000 and 40,000 signals per 360° rotation. These signals are preferably provided as analog sinusoidal signals. In a further preferred embodiment, these sinusoidal signals are electronically interpolated 1024-fold, for example. At a resolution of 36,000 signals per 360° rotation, 36 million pulses then result.

The angle measuring system which is assigned to the revolving centering means preferably provides between 50 and 5000 signals per 360° rotation. Preferably, the signals of this angle measuring system are also provided as analog sinusoidal signals. In a further preferred embodiment, these sinusoidal signals are electronically interpolated at the same rate, i.e., 1024-fold. At a resolution of 100 signals per 360° rotation, 100,000 pulses then result, for example.

Using such a design of the two angle measuring systems, slip which is a few minutes of angle in size may be recognized. This is sufficient, since investigations have shown that smaller slip hardly occurs.

The angular velocity of the dog 13 is calculated from the differential of the angle over time and the angular acceleration is calculated from the differential of the angular velocity over time.

Preferably, drive-side angle measuring systems having a resolution of at least n1=10,000 angle steps per 360° rotation are used, as described. Resolutions of n1=36,000 angle steps or more per 360° rotation are especially preferred. A resolution of n1=36,000 angle steps per 360° rotation is especially suitable.

Resolvers and incremental transmitters are especially suitable as angle measuring systems. The construction of a resolver corresponds to that of a two-strand induction machine. Embodiments without their own bearings, in which the rotor is mounted directly on the motor shaft of the drive, are distributed most widely. Such a resolver may be seated directly on the shaft which moves the dog 13.

In the highest precision embodiments, the incremental transmitter described in the following is frequently used. Incremental transmission of the angle information from the angle measuring system to a regulator of the drive 12 offers the advantage that only two signals are necessary in order to transmit the information about the movement direction, the speed, and the relative angular position. There are multiple possibilities for implementing incremental transmitters. In connection with the present invention, magnetic field detectors and photoelectric angle detectors are preferably used.

The magnetic field detectors comprise a measurement standard and a sensor head. At least two sensors are mounted in the sensor head at an interval in order to implement a phase shift of 90° between two track signals. The magnetic field is modulated by the relative motion between the measurement standard and sensor. The measurement standard may be implemented as magnetically active or magnetically passive in this case.

Figure 3A:
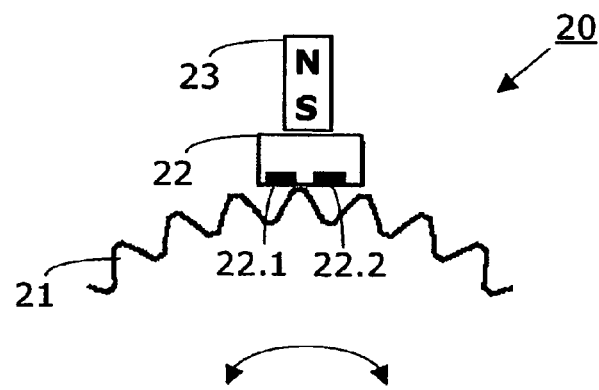
FIG. 3A a schematic transverse section of the details of an angle measuring system according to the present invention which revolves synchronously with a centering means, FIG. 3B a perspective detail view of the angle measuring system revolving synchronously with the centering means shown in FIG. 3A, FIG. 4 a perspective detail view of a further angle measuring system according to the present invention.
Figure 3B:
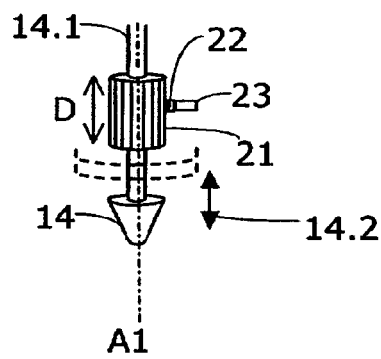

FIGS. 3A and 3B show the application according to the present invention of a magnetic field detector 20 as an angle measuring system on the revolving side of the device 10. The detector 20 is a detector having a magnetically passive measurement standard. The actual sensors 22.1, 22.2 are positioned between a permanent magnet 23 and a gearwheel 21 made of highly permeable material. The reluctance in the magnetic circuit thus constructed changes as a function of angle. The flux density and/or field strength at the sensor head 22 is measured via the Hall effect, the magnetoresistive effect, or using eddy current sensors. The gearwheel 21 is a cylindrical gearwheel having spur toothing. The thickness D of the gearwheel is selected so that in spite of axial displacement of the revolving centering tip 14, the teeth of the gearwheel 21 are always located in the region of the sensor head 22.

Precise angle detectors 20 require high frequencies m0 and therefore gearwheels 21 having a relatively large diameter. If a frequency m0 per 360° circumference of $m0=2^8$ is desired, the gearwheel 21 typically has a diameter of more than 50 mm. In addition to the frequency, the interval between the two sensors 22.1 and 22.2 is also included in this calculation.

A higher frequency m0 may be achieved with compact dimensions using an active measurement standard, the use of such an active measurement standard not being absolutely necessary according to the present invention in the output-side angle detector 20, since the angular resolution of the angle detector 20 may be less than the angular resolution of the first angle detector, as described above.

Figure 4:
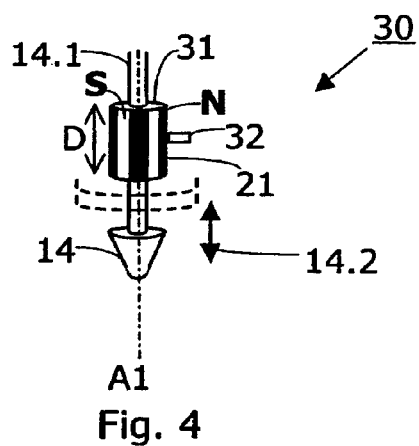

One embodiment of an active angle detector 30 may comprise a magnetized film or a magnetized ring, which is implemented as cylindrical and is positioned coaxially to the axis A1. A Hall sensor is then used as the sensor head 32. An exemplary embodiment is shown in FIG. 4. A cylindrical body 31 is provided, which is positioned coaxially to the axis A1 and is seated on the shaft 14.1. The body 31 has a magnetic detector polarization having alternating N and S polarized segments, as indicated in FIG. 4. The Hall sensor 32 is seated next to the body 31 and detects each angle change on the basis of the N and S polarized segments traveling past. The thinner the N and S polarized segments are in the direction of the circumference, the higher the angular resolution of the arrangement 30 shown. The second angle measuring system preferably has n2 segments, n2 being less than n1.

The photoelectric measuring principal may also be used, an optical sensor detecting segments of a cylindrical body traveling past.

As described on the basis of the exemplary embodiment shown in FIGS. 3A, 3B, and 4, according to the present invention, the second angle measuring system, which is assigned to the revolving centering means, comprises a cylindrical body that is positioned coaxially to the axis of rotation A1 and is mounted so that it is displaceable, together with the centering means, parallel to this axis A1. The cylindrical body has segmenting of the mantle surface which divides of the mantle of the cylinder into strip-shaped segments, whose longitudinal direction runs parallel to the axis of the cylindrical body. The cylindrical body is thus divided into a number of n2 segments (measurement standard), which move past a sensor head when the cylindrical body rotates around the axis of rotation A1. The sensor head may recognize the changes resulting through the segments moving past and process them in order to thus allow a statement about the relative and/or absolute angle change.

According to the embodiments of the present invention described up to this point, the sensor head is positioned stationary. The displaceability is made possible in that the cylindrical body may be displaced parallel to the axis A1, without impairing the function of the angle measuring system.

In a further embodiment, both the measurement standard and the sensor are positioned displaceably, the position of the measurement standard and the sensor in relation to one another not changing. This is preferably achieved in that the sensor has a vertical guide which permits vertical displacement (parallel to the axis A1), but prevents rotation around the axis A1. In a preferred embodiment, a pin-groove connection is provided between sensor and housing (and/or a suspension of the housing). Thus, for example, the sensor may have a vertically running groove on the side facing away from the measurement standard in order to ensure vertical sliding of the sensor in relation to a stationary pin attached to the housing.

Figure 5:
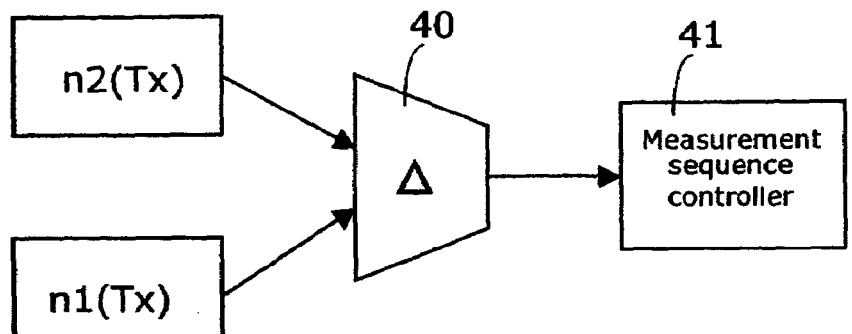
FIG. 5 a schematic block diagram of a further embodiment of the present invention.

A schematic block diagram of a further embodiment is shown in FIG. 5. This is an embodiment in which the angular positions on the drive side and the output side are determined as absolute values. The angular position on the drive side n1 in the instant Tx is identified by n1(Tx) and the angular position on the output side n2 in the instant Tx is identified by n2(Tx). A comparison is performed by the software means 40, which may be a simple subtraction in the example shown. If there is a difference between the two angular positions, i.e., if n1(Tx)≠n2(Tx), a signal is then transmitted to the measurement sequence controller 41. The measurement sequence controller 41 then interrupts the measurement sequence, as described above.

Figure 6A:
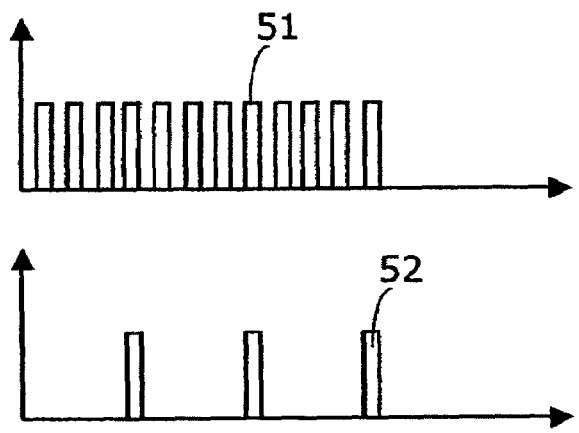
FIG. 6A a schematic diagram to explain the relative angle measurement according to the present invention.
Figure 6B:
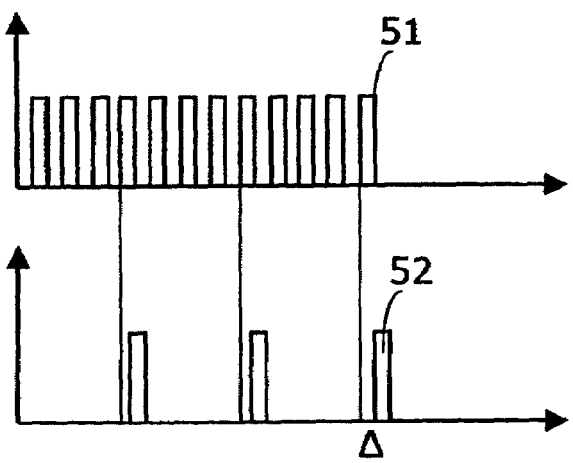
FIG. 6B a further schematic diagram to explain the relative angle measurement according to the present invention.

An embodiment using relative comparison of the angular positions is shown in FIGS. 6A and 6B on the basis of two examples in diagram form. The time is plotted on the horizontal axis and the vertical axis indicates the signal strength (amplitude). In the upper graph of diagram 6A, the pulse frequency which results when scanning the drive-side rotation is shown. The pulse frequency is shown in the form of a simple rectangular pulse 51 after an analog/digital conversion. Twelve pulses 51 correspond to a first angular position. In synchronization thereto, the pulses 52 of the output-side angle detector are recorded, as shown in the lower graph of diagram 6A. The second angle detector has a lower angular resolution. It provides only a fourth of the pulses which the first angle detector provides (n1=4×n2). If the pulses 52 are synchronous to the pulses 51, it may be assumed that there is no slip. There is no slip in FIG. 6A.

In contrast, there is an angular deviation between the drive and output sides in FIG. 6B, as shown by a slight displacement of the pulses 52 in relation to the pulses 51. It may be seen from this displacement that slip has occurred.

It is an advantage of the present invention that simple dogs 13 may be used, which exert a force transmission on the position part 11 in peak traction. In this case, the force transmission occurs via mutual friction. Dogs 13 of this type are relatively simple to handle. In addition, they may be loaded automatically, which allows complete automation of the measuring system.

Using a CNC measuring device according to the present invention, in addition to externally-toothed spur gears, internal teeth, bevel gears, worms, gear cutting tools and the like may be measured, the measuring device having a vertical axis of rotation and receiving the rotationally symmetric workpieces coaxially.

What is claimed is:

1. A device for measuring a rotationally symmetric precision part, having a dog, drivable via a drive, and a revolving centering means, the dog and the revolving centering means being positioned so that a rotationally symmetric precision part to be measured may be clamped non-positively and coaxially between the dog and centering means, and a first angle measuring system being assigned to the dog, which provides signals that permit the drive-side angular position of the dog to be determined, characterized in that a further angle measuring system is assigned to the revolving centering means, which provides signals that permit the output-side angular position of the centering means to be determined, and software means are provided, which determine a slip between the dog and the rotationally symmetric precision part through a comparative calculation on the basis of the drive-side angular position and the output-side angular position.

2. The device according claim 1, characterized in that the dog is solidly connectable to a table, which is rotatable by the drive around a first axis of rotation, the dog having an axis of rotation that runs coaxially to the first axis of rotation.

3. The device according to claim 2, characterized in that the dog is implemented as a centering tip.

4. The device according to claim 2, characterized in that the dog comprises clamping means which are implemented so that the rotationally symmetric precision part to be measured may be non-positively clamped coaxially to the first axis of rotation.

5. The device according to claim 1, characterized in that the revolving centering means are implemented as a centering tip, which is set into rotation around the first axis of rotation through frictional connection to the rotationally symmetric precision part to be measured.

6. The device according to claim 1, characterized in that the revolving centering means are displaceable parallel to the first axis of rotation in order to allow manual or automatic clamping of the precision part.

7. The device according to claim 1, characterized in that the further angle measuring system comprises a cylindrical body, which is connected and mounted together with the revolving centering means in such a way that it is displaceable parallel to the axis of rotation (A1) without impairing the function of this further angle measuring system.

8. The device according to claim 6, characterized in that the further angle measuring system is mechanically coupled to the revolving centering means (14) in such a way that it permits the displaceability parallel to the first axis of rotation.

9. The device according to claim 1, characterized in that the further angle measuring system has a lower angular resolution than the first angle measuring system, the software means being able to recognize the slip but not quantify it.

10. A CNC measuring device for measuring a gearwheel, characterized in that it comprises a device according to one of the preceding claims, the dog and the centering means being designed for clamping the gear wheel and a CNC controller being provided which allows the gearwheel to be rotated into different angular positions and scanned using a measuring head.

11. The CNC measuring device according to claim 10, characterized in that the drive alternately rotates and stops the gearwheel around an angle of rotation, the measurement on the gearwheel able to be performed in the stopped state using the measuring head.

12. The CNC measuring device according to claim 10, characterized in that during rotation, an angular acceleration of the gearwheel may be set in such a way that no slip arises between the dog and the gearwheel.

13. The CNC measuring device according to claim 10, characterized in that no measurement is performed if slip arises, but rather a running measurement is either interrupted or terminated.

14. The CNC measuring device according to claim 10, characterized in that a test run may be requested before the measurement, which drives the gearwheel at various angular accelerations in order to determine a maximum permissible angular acceleration from which slip occurs, angular accelerations which are lower than the maximum permissible angular acceleration preferably being set during the subsequent measurement.

15. A method for measuring a rotationally symmetric precision part using a CNC measuring device having a dog, drivable via a drive, and a revolving centering means, characterized in that the method comprises the following steps:

frictionally clamping the precision partly between the dog and the revolving centering means in such a way that the precision part is coaxially mounted between dog and centering means, rotation of the precision part by driving the dog using the drive, a determination of the drive-side angular position being made possible using a first angle measuring system, which provides signals, determining an output-side angular position of the centering means using a second angle measuring system, which provides signals that permit the output-side angular position to be determined, comparing the drive-side angular position and the output-side angular position in order to determine slip between the dog and the precision part.

16. The method according to claim 15, characterized in that the steps cited are performed during the execution of measurement steps, a measuring head employed during the execution of the measuring steps only being used if no slip was recognized.

17. The method according to claim 15, characterized in that the steps cited are performed before the execution of measurement steps, the drive driving the precision part at different angular accelerations in order to determine a maximum permissible angular acceleration, from which slip occurs, and angular accelerations which are lower than the maximum permissible angular acceleration preferably being set during the execution of the measurement steps.

18. The method according to claim 15, characterized in that, before the rotation of the precision part, an initialization step is executed in order to allow an equalization between the first angle measuring system and the second angle measuring system.

* * * * *

UNITED STATES PATENT AND TRADEMARK OFFICE
CERTIFICATE OF CORRECTION

PATENT NO. : 7,117,609 B2 Page 1 of 1
APPLICATION NO. : 11/081189
DATED : October 10, 2006
INVENTOR(S) : Georg Mies et al.

It is certified that error appears in the above-identified patent and that said Letters Patent is hereby corrected as shown below:

Claim 15, Col. 12, line 1, delete the word "partly" and replace it with the word --part--.

Signed and Sealed this

Ninth Day of January, 2007

JON W. DUDAS
*Director of the United States Patent and Trademark Office*